US005664833A

United States Patent [19]
Celestina-Krevh et al.

[11] Patent Number: 5,664,833
[45] Date of Patent: Sep. 9, 1997

[54] CHILD'S CAR SEAT WITH IMPROVED ROTATABLE OVERHEAD SHIELD

[75] Inventors: MaryAnn Celestina-Krevh, Euclid; William T. Ward, Jr., Uniontown; Michael P. Green, Youngstown, all of Ohio

[73] Assignee: Century Products Company, Macedonia, Ohio

[21] Appl. No.: 691,808

[22] Filed: Jul. 31, 1996

[51] Int. Cl.⁶ .................................................. A47C 1/08
[52] U.S. Cl. .................................. 297/256.15; 297/488
[58] Field of Search ........................... 297/487, 488, 297/256.15, 250.1, 216.11, 467

[56] References Cited

U.S. PATENT DOCUMENTS

| 2,508,822 | 6/1950 | Goldberg | 297/467 X |
| 2,690,790 | 10/1954 | Linden | 297/467 X |
| 4,909,574 | 3/1990 | Sedlack | 297/488 |
| 5,427,432 | 6/1995 | Meeker et al. | 297/256.15 |
| 5,511,850 | 4/1996 | Coursey | 297/488 X |
| 5,538,322 | 7/1996 | Cone et al. | 297/256.15 |
| 5,558,405 | 9/1996 | Ishikura et al. | 297/487 |

FOREIGN PATENT DOCUMENTS 1243930  11/1988  Canada .............................. 297/467

*Primary Examiner*—Milton Nelson, Jr.
*Attorney, Agent, or Firm*—Graham & James LLP

[57] ABSTRACT

An overhead safety shield for an infant's car seat is rotatably coupled to the arms connecting the shield to the sides of the car seat. A detent mechanism provides positive locking engagement for the shield relative to the arms so that the shield can be fixed at one of several different angular positions about the pivot axis. The attitude of the shield can be set at the most convenient position for the occupant of the seat.

8 Claims, 5 Drawing Sheets

CHILD'S CAR SEAT WITH IMPROVED ROTATABLE OVERHEAD SHIELD

BACKGROUND OF THE INVENTION

This invention relates to infants' and children's car seats having overhead shields. More particularly, this invention relates to such a car seat provided with an overhead shield which is rotatable among several fixed positions.

Infants' and children's car seats are known which are provided with a safety shield which is pivotally attached at an appropriate point to the sides of the seat. Such shields are typically U-shaped with a padded central section to cushion the occupant in the event of a collision, and the shield is pivotally attached to the sides of the seat so as to be maneuverable to an overhead position in which the infant or child can be easily placed in and removed from the car seat.

Most such overhead shields have arms of fixed length, which suffers from the disadvantage that as the infant grows in size, insufficient space is afforded by the inner periphery of the shield to comfortably accommodate the child. At this point, the shield loses its utility. One solution to this problem is to provide a car seat with an overhead shield which is freely rotatable about the longitudinal axis of the shield. However, this solution suffers from the disadvantage that the shield will rotate to a position in which it maintains contact with a portion of the infant or child's body, typically the thighs. Many infants and children find this contact uncomfortable and confining.

SUMMARY OF THE INVENTION

The invention comprises an overhead shield for an infant's and child's car seat which is rotatably arranged on the longitudinal axis and provided with mechanical detents to provide a plurality of different fixed rotational positions for the shield in order to accommodate occupants of different sizes, ranging from an infant to a small child.

The shield comprises first and second arm members, each having an attachment end and a distal end; and a shield member having first and second ends, each pivotally attached to the attachment end of a corresponding one of the first and second arm members. Each end of the shield member includes a detent member retractably mounted therein, and each attachment end of the first and second arm members has a detent socket provided with a plurality of angularly spaced detent channels. The detent is releasably engageable with the plurality of angularly spaced detent channels so that the shield member can be rotatably positioned to any one of a plurality of rotational positions and fixed therein.

The detent member preferably includes a detent arm extending outwardly from the associated end of the shield member, the detent arm preferably having central U-shaped cross-section with flanking flanged portions. In order to afford adequate angular rotational freedom, the first and second ends of each shield member include a partition having a sector shaped aperture through which the associated detent arm extends into the attachment end of the corresponding arm member.

The shield can be rotationally positioned to the angular attitude most convenient and suitable for the occupant of the car seat, whether infant, toddler or child. The invention affords an appropriate amount of leg and chest clearance for the size of the occupant, avoiding mandatory contact between the outer surface of the shield and the body of the occupant, which provides better comfort.

For a fuller understanding of the nature and advantages of the invention, reference should be made to the ensuing detailed description, taken in conjunction with the accompanying drawings.

DETAILED DESCRIPTION OF THE PREFERRED EMBODIMENT

Figure 1:
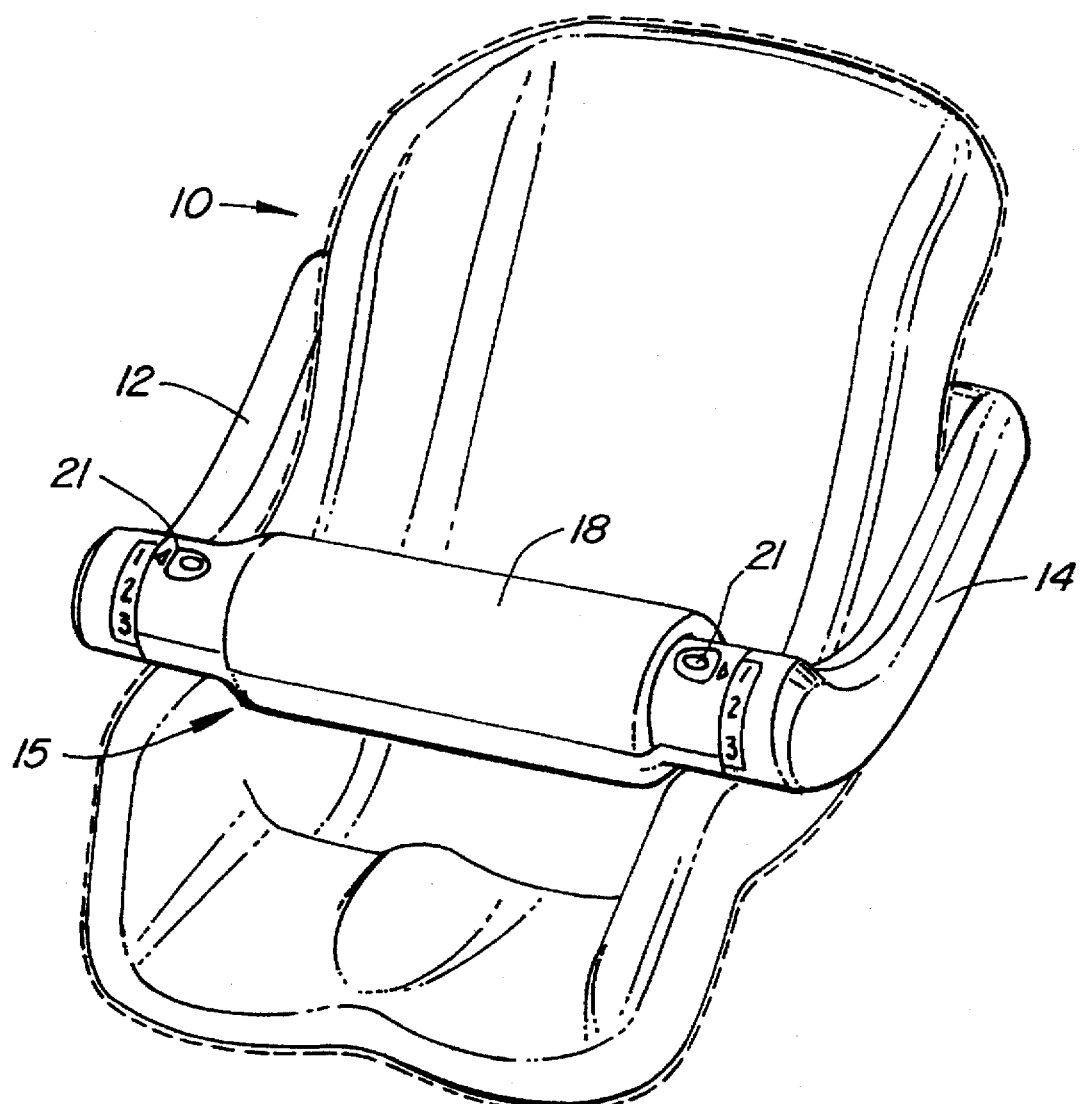
FIG. 1 is a perspective view of a car seat incorporating the invention.

Turning now to the drawings, FIG. 1 is a perspective view of a preferred embodiment of the invention installed in a car seat generally designated with reference numeral 10. As seen in this figure, the overhead shield comprises a generally U-shaped device having a pair of arms 12, 14 and a central member generally designated with reference numeral 15. Arms 12, 14 are pivotally attached to the outer side walls of car seat 10 in any suitable fashion so as to be maneuverable from the position illustrated to an overhead position in which an infant or child can be placed in the car seat 10 or removed therefrom without interference from the shield.

Figure 3:
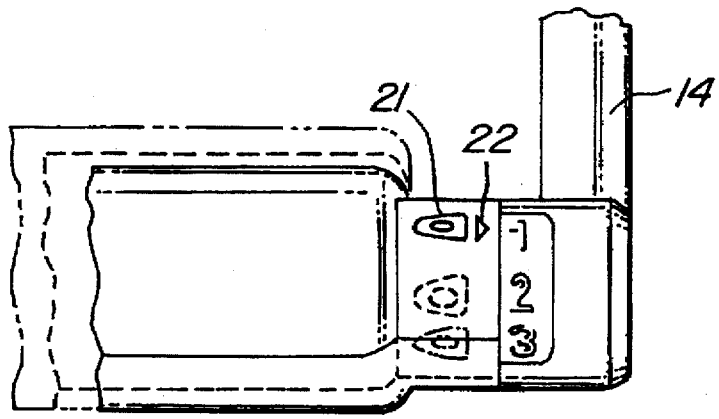
FIG. 3 is a schematic view illustrating different fixed rotation positions of the preferred embodiment of the invention.
Figure 2:
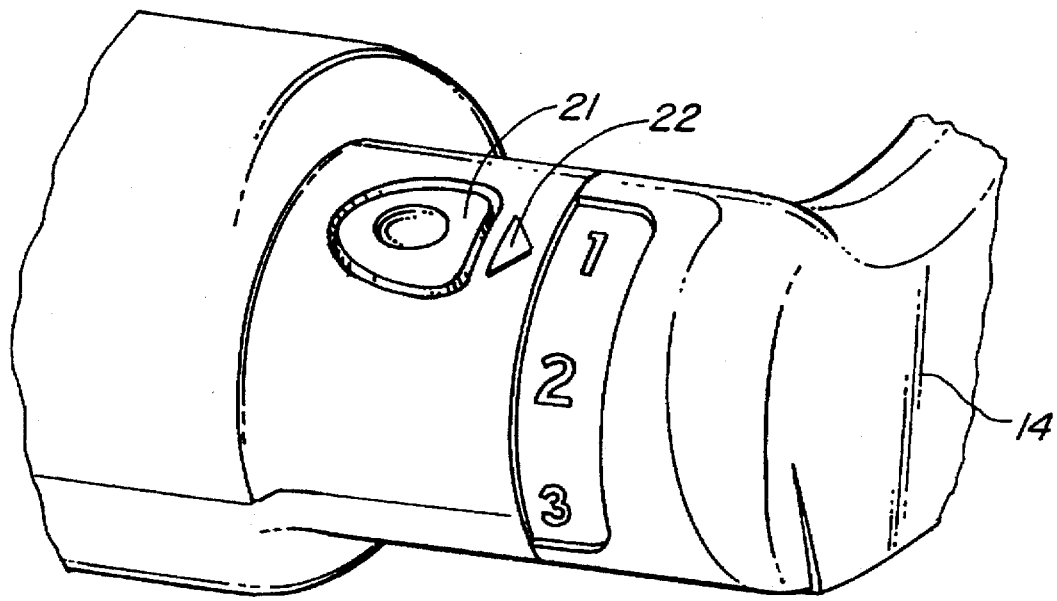
FIG. 2 is an enlarged detail view of the right end of the shield.

Central member 15 includes a padded center portion 18 which provides a cushion against sudden impacts. Padded center portion 18 is arranged about the body structure of the shield described below which is pivotally attached to arms 12, 14 and provided with mechanical detents at each end in order to enable the shield to be secured in one of several different angular positions with respect to the body axis or the axis of rotation. With reference to FIGS. 2 and 3, in a preferred embodiment three different angular detent positions are provided as suggested by the three different angular positions of the shield illustrated in solid, broken and phantom lines in FIG. 3.

The shield 15 is released from the detent position by the simultaneous depression of a pair of push buttons 21 forming part of the detent mechanism at each end of the shield. Arrow indicator 22 points to one of three numeric indicia 1, 2, 3 to indicate the angular position in which the shield is located. To change positions, the push buttons 21 are depressed and the shield 15 is rotated about the pivot axis to another detent position, after which the push buttons 21 are released.

Figure 4:
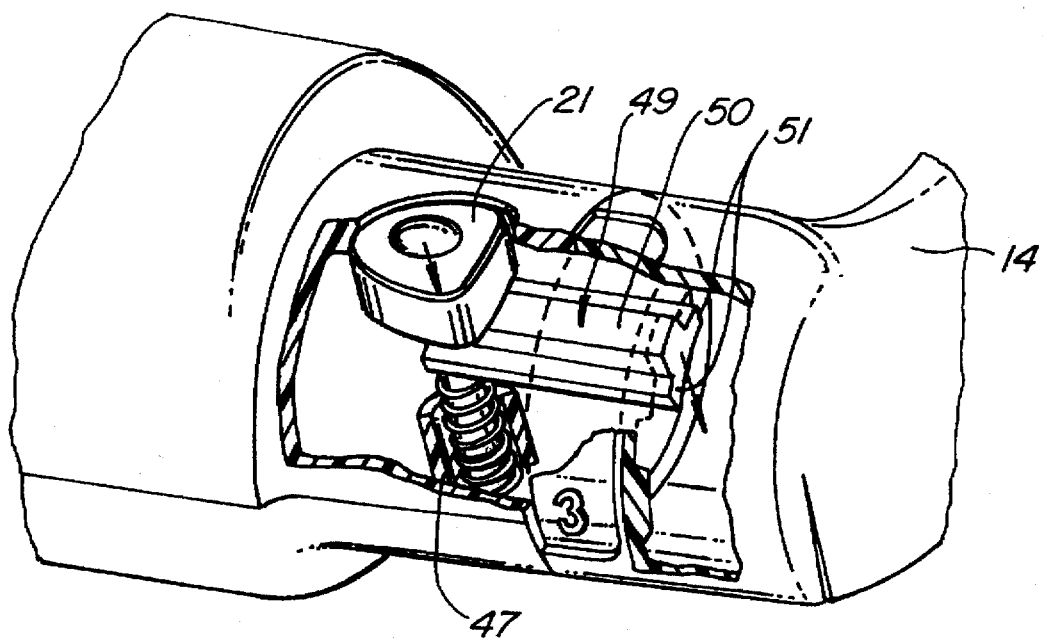
FIG. 4 is an enlarged detail view partially broken away illustrating the push button and detent mechanism.
Figure 5:
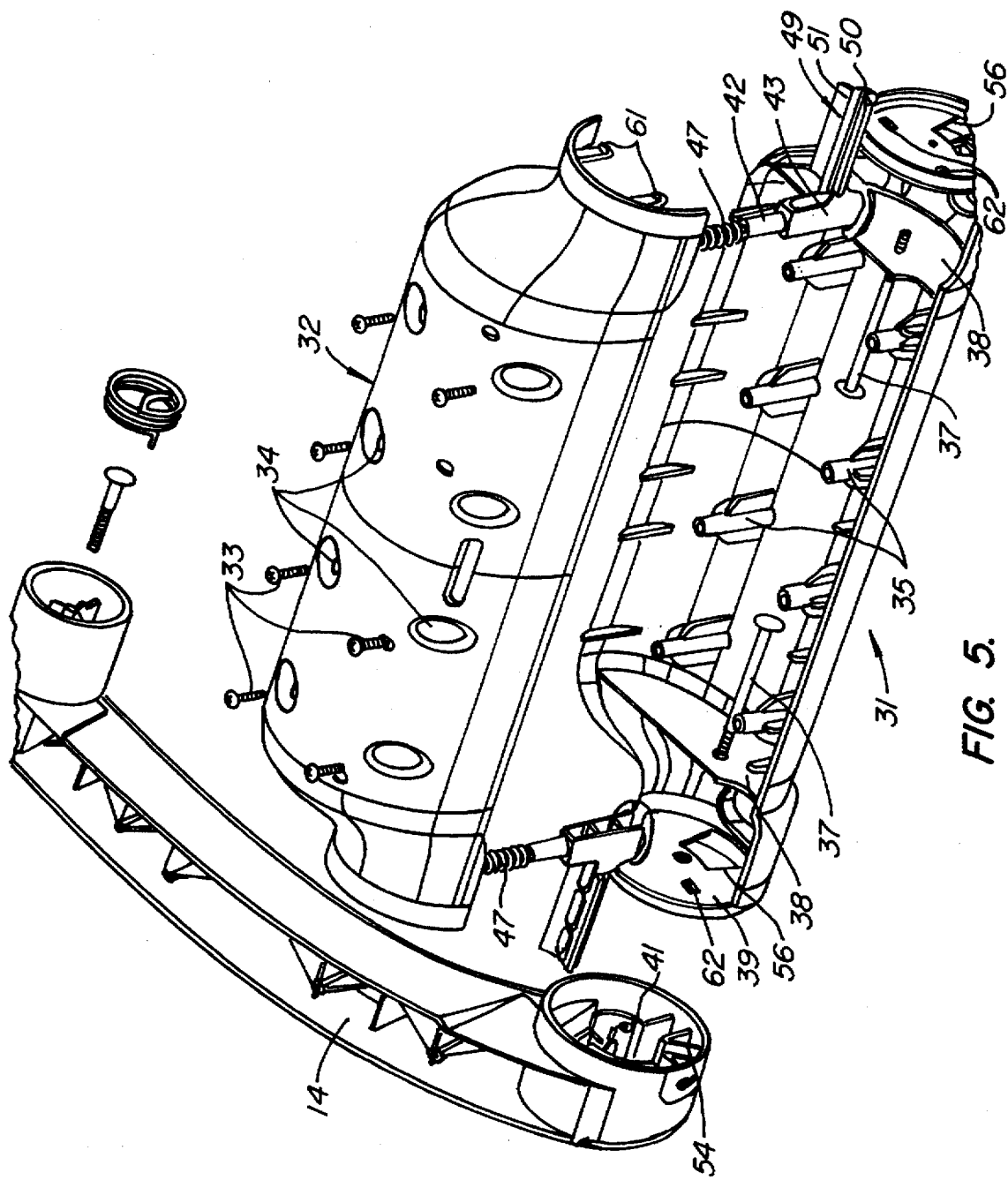
FIG. 5 is an exploded perspective view illustrating the several components of the preferred embodiment.

FIG. 4 illustrates a portion of the detent mechanism and FIG. 5 is an exploded inverted perspective view taken from below of the preferred embodiment of the invention. As seen in FIG. 5, the pivotal shield comprises a pair of complementary housing members 31, 32 secured together by means of a plurality of screw fasteners 33 arranged through apertures 34 and threaded into mounting posts 35 formed in the interior of upper casing half 31. The shield 15 is pivotally attached to the proximal end of each arm 12, 14 by means of fetter pins 37 each of which passes through an aperture in a strengthening partition 38 and an end wall 39 in upper casing half 31, and is press fitted into a mounting bore 41 formed in the proximal receiving end of the corresponding arm 12, 14.

Figure 6:
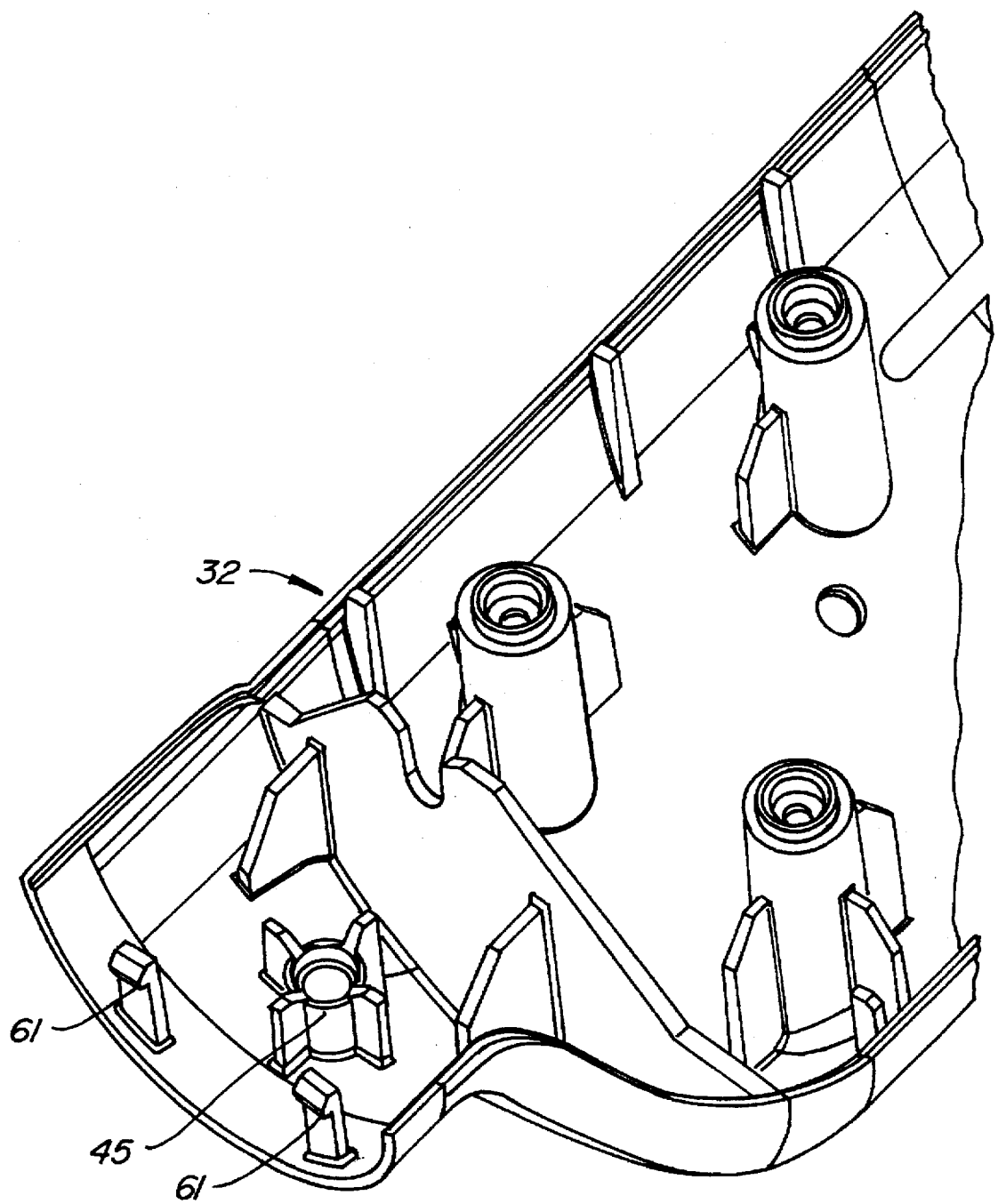
FIG. 6 is an enlarged detail view of the left end of lower casing half 32.
Figure 7:
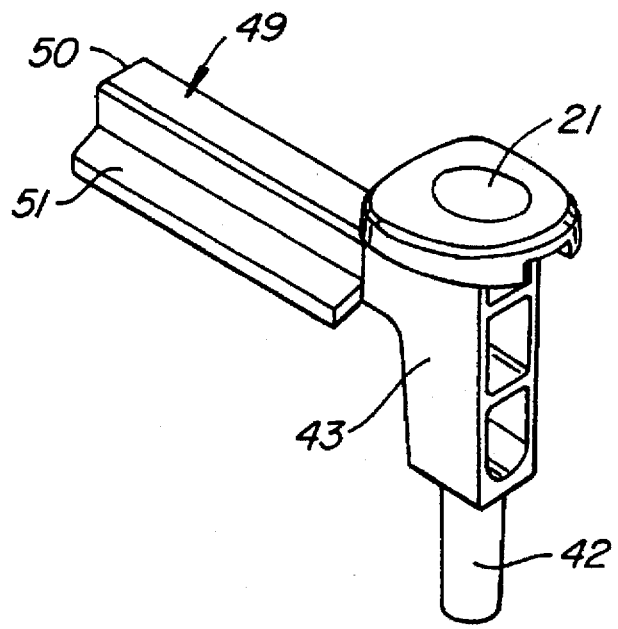
FIG. 7 is a perspective view of the unitary detent member.

A pair of detent mechanisms is provided: one at each end of shield 15. Each detent mechanism comprises a compound unitary member illustrated in perspective view in FIG. 7 having a mounting post portion 42, a main body portion 43 and an upper push button surface 21. As best shown in FIG. 6, which is a perspective partial detail view of the left end of lower casing half 32, the mounting post portion 42 of each detent mechanism is received in a socket 45 formed adjacent the end of lower casing half 32. With reference to FIGS. 4 and 5, a bias spring 47 is arranged about post portion 42 and provides an upward biasing force for the detent mechanism, with the bottom of spring 47 resting in the socket 45 (see FIG. 6) and the top of spring 47 engaging the lower surface of main body portion 43.

Figure 8:
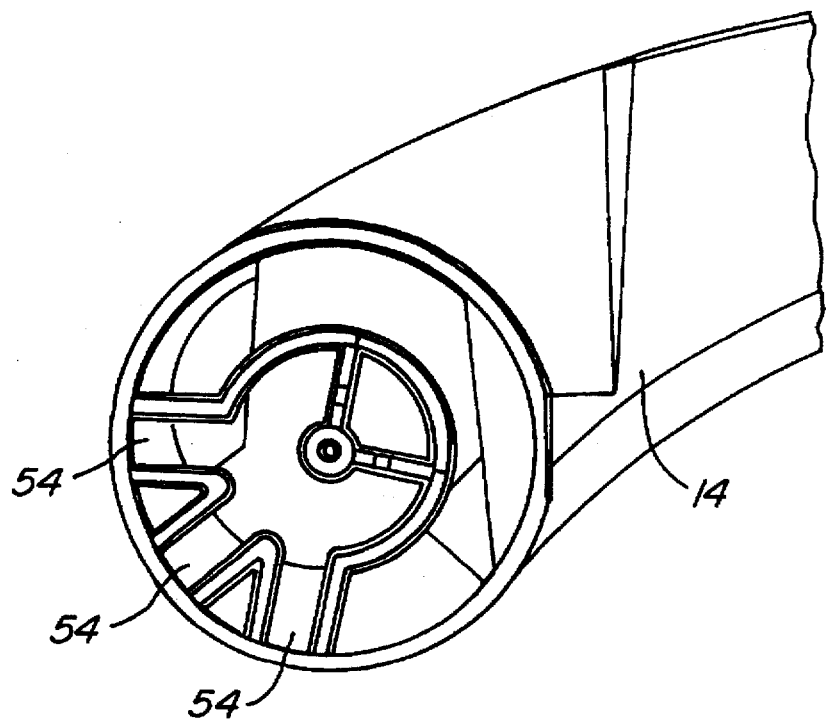
FIG. 8 is an end view of the proximal receiving end of arm 14 illustrating the detent sockets.

The detent mechanism includes a laterally extending detent arm generally designated with reference numeral 49 having a central U-shaped profile 50 with flanking arcuate portions 51. The U-shaped central detent portions 50 are dimensioned and configured to be slidably received within a plurality of detent channels 54 (shown in FIGS. 5 and 8) formed in the proximal receiving ends of arms 12, 14. In the assembled state, each detent arm 49 extends through a sector shaped opening 56 in the corresponding end partition 39, the sector shape being provided in order to accommodate the required degree of rotational freedom for the shield 15.

Casing halves 31, 32 are further secured together at the ends thereof by means of mating flexible fingers 61 extending upwardly from bottom half casing 32 and mating apertures 62 formed in the end walls 39 of upper casing half 31.

In use, shield 15 is rotated to one of the three fixed rotational positions by depressing on the push button surfaces 21. As the detent mechanism retracts inwardly of shield 15, detent portions 50 travel radially inwardly of the channels 54. When the detent portion 50 clears the current channel 54, the entire shield can be rotated about pivot pins 37 to the next desired position. When the force applied to the push button surface 21 is released, spring 47 forces the detent portions 50 into the corresponding channels 54.

As will now be apparent, car shields fabricated in accordance with the teachings of the invention provide several fixed rotational positions for the shield. As a consequence, the shield can be rotationally positioned to the angular attitude most convenient and suitable for the occupant of the car seat, whether infant, toddler or child. This affords an appropriate amount of leg and chest clearance for the size of the occupant, avoiding mandatory contact between the shield outer surface and the body of the occupant, which provides better comfort.

While the above provides a full and complete disclosure of the preferred embodiment of the invention, various modifications, alternate constructions and equivalents may be employed, as desired. For example, while the invention has been described with reference to an embodiment which affords three angular positions, an additional number of detent portions may be provided, as desired. Therefore, the above description and illustrations should not be construed as limiting the scope of the invention, which is defined by the appended claims.

What is claimed is:

1. An adjustable overhead shield for an infant's car seat, said shield comprising:

first and second arm members, each having an attachment end and a distal end; and a shield member having a longitudinal axis and first and second ends, each of said first and second ends being pivotally attached to the attachment end of a corresponding one of said first and second arm members, each end of said shield member including a detent member retractably mounted therein along a retraction direction substantially normal to said longitudinal axis, each attachment end of said first and second arm members having a detent socket provided with a plurality of angularly spaced detent channels, each of said detent channels being defined by a pair of spaced wall portions provided in said socket, said detent member being releasably engageable with said plurality of angularly spaced detent channels so that said shield member can be rotatably positioned to any one of a plurality of rotational positions and fixed therein.

2. The invention of claim 1 wherein said detent members each includes a detent arm extending outwardly from the corresponding one of said first and second ends of said shield member.

3. The invention of claim 2 wherein said detent arm has a central U-shaped cross section and flanking flange portions.

4. The invention of claim 2 wherein said first and second ends of said shield member each includes a partition having a sector shaped aperture, and wherein said detent arm extends through said sector shaped aperture.

5. In combination:

an infant's car seat having a main body portion; and an adjustable overhead shield attached to said main body portion of said infant's car seat, said shield comprising:

first and second arm members each having a distal end attached to said main body portion of said car seat and an attachment end; and a shield member having a longitudinal axis and first and second ends, each of said first and second ends being pivotally attached to the attachment end of a corresponding one of said first and second arm members, each end of said shield member including a detent member retractably mounted therein along a retraction direction substantially normal to said longitudinal axis, each attachment end of said first and second arm members having a detent socket provided with a plurality of angularly spaced detent channels, each of said detent channels being defined by a pair of spaced wall portions provided in said socket, said detent member being releasably engageable with said plurality of angularly spaced detent channels so that said shield member can be rotatably positioned to any one of a plurality of rotational positions and fixed therein.

6. The invention of claim 5 wherein said detent members each includes a detent arm extending outwardly from the corresponding one of said first and second ends of said shield member.

7. The invention of claim 6 wherein said detent arm has a central U-shaped cross-section and flanking flange portions.

8. The invention of claim 6 wherein said first and second ends of said shield member each includes a partition having a sector shaped aperture, and wherein said detent arm extends through said sector shaped aperture.

\* \* \* \* \*